(12) United States Patent
Nakamura et al.

(10) Patent No.: US 7,435,003 B2
(45) Date of Patent: Oct. 14, 2008

(54) FLUID DYNAMIC BEARING UNIT

(75) Inventors: Junichi Nakamura, Ozu (JP);
Tomohiro Haga, Ozu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 761 days.

(21) Appl. No.: 11/108,300

(22) Filed: Apr. 18, 2005

(65) Prior Publication Data
US 2005/0238267 A1 Oct. 27, 2005

(30) Foreign Application Priority Data
Apr. 26, 2004 (JP) ............................. 2004-129765

(51) Int. Cl.
F16C 32/06 (2006.01)
(52) U.S. Cl. ..................... 384/112; 384/107; 384/121; 384/123
(58) Field of Classification Search .......... 384/107, 384/112, 113, 121, 122, 123, 124, 420–427, 384/368–371, 243; 29/898.02, 898.04
See application file for complete search history.

(56) References Cited
U.S. PATENT DOCUMENTS 6,059,459 A * 5/2000 Ichiyama .................... 384/112
6,066,903 A * 5/2000 Ichiyama ..................... 310/90
6,126,320 A * 10/2000 Ichiyama .................... 384/112
6,264,368 B1 * 7/2001 Tanaka et al. ............... 384/112
6,483,215 B1 * 11/2002 Bodmer et al. ................ 310/90

FOREIGN PATENT DOCUMENTS
JP 08-214497 A 8/1996
JP 10-318253 A 12/1998

* cited by examiner

Primary Examiner—Richard W L Ridley
Assistant Examiner—Justin Krause
(74) Attorney, Agent, or Firm—Panitch Schwarze Belisario & Nadel LLP

(57) ABSTRACT

A flange on a shaft of a fluid dynamic bearing unit is to be provided with a hole connecting an outer periphery of the flange and an outer periphery of the shaft. A radial groove is provided on a surface of two flange half pieces, and a vertical groove communicating with the radial groove is provided on an inner circumferential surface of the flange half pieces. Upon combining the two flange half pieces with the grooves facing each other and attaching them to the shaft, a path connecting an outer periphery of the flange and an outer periphery of the shaft is formed. The groove may be formed in a desired cross-sectional shape such as a semicircle, triangle or rectangle. The groove may be formed only on either of the flange half pieces, and the groove can be formed by a simple process such as pressing.

10 Claims, 14 Drawing Sheets

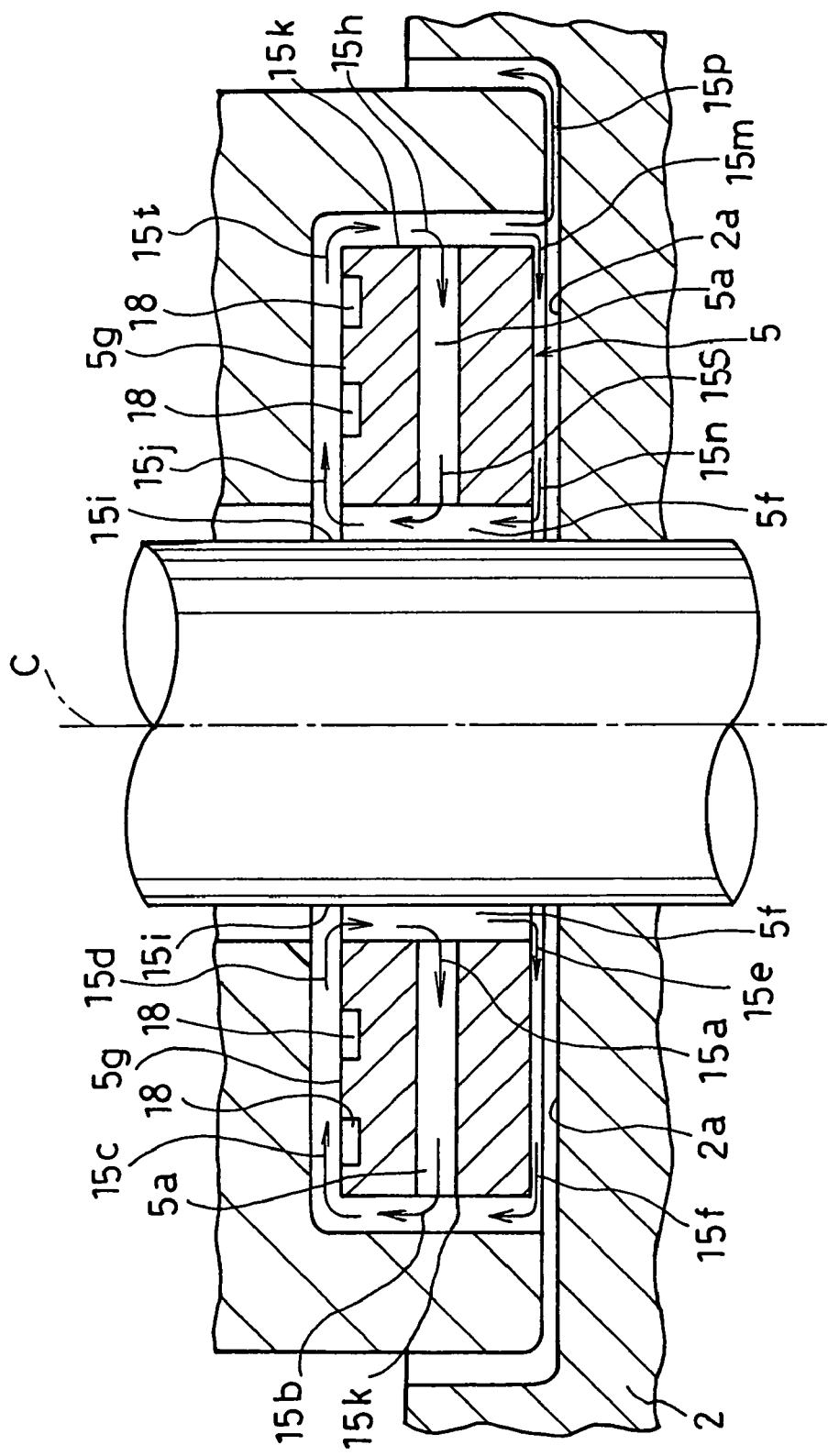

FLUID DYNAMIC BEARING UNIT

BACKGROUND OF THE INVENTION

The present invention relates to a fluid dynamic bearing unit that drives a fluid such as a lubricant to generate a dynamic pressure, and to cause relative contactless rotation between a shaft and a retaining member thereof.

Fluid dynamic bearing units and motors including the same are employed in various rotational mechanisms that are continuously put into service over a long period of time, and hence required to have a long product life and reliability for a long-term use, such as a DC motor for driving a hard disk. One of such motors having a fluid dynamic bearing unit is disclosed in JP-A No. H10-318253, which will be reviewed below referring to FIG. 14. FIG. 14 is a fragmentary cross-sectional view of the fluid dynamic bearing unit according to the cited document, only showing the right relevant parts thereof for the purpose of description.

In FIG. 14, a column-shaped shaft 101 is fixed to a base plate 102, which is configured in common with a base member for a hard disk unit, for example. The shaft 101 is provided with a disk-shaped flange 126 fixed to an upper end portion thereof, according to the orientation of FIG. 14. The shaft 101 is inserted into a bearing bore 130a of a sleeve 130. The sleeve 130 is rotatably supported by the shaft 101. A hub 108 having a rotor magnet 112 is attached to the sleeve 130. The hub 108 includes a disk seat 110, on which a recording and reproducing disk, such as a magnetic disk (not shown) is placed. The base plate 102 is provided with a stator 114 located so as to oppose the rotor magnet 112, and to thus give a rotating force to the hub 108. Above the flange 126, a ring-shaped cap 138 is provided.

The bearing bore 130a of the sleeve 130 is provided with a herringbone-shaped radial dynamic pressure groove (not shown) formed on the inner circumferential surface thereof, which constitutes a radial fluid dynamic bearing section 144. The flange 126 is provided with a herringbone-shaped thrust dynamic pressure groove (not shown) formed on both faces thereof, which respectively constitutes a thrust fluid dynamic bearing sections 154 and 156. The flange 126 includes two circulation holes 176 oriented substantially perpendicular to the central axis of the shaft 101, with approximately 180 degrees of central angle. The inner circumferential end portions of the circulation holes 176 are respectively communicating with a through hole 174 formed on an outer circumferential surface of the shaft 101 in an axial direction. Both open ends of the through holes 174 communicate with a gap between the shaft 101 and the bearing bore 130a. The circulation holes 176 and the through holes 174 achieve communication with a gap 156a between the upper face of the flange 126 and the cap 138, a gap 154a between the lower face of the flange 126 and the sleeve 130 and a gap 180a between the outer circumferential surface 180 of the flange 126 and the sleeve 130. A lubricating fluid such as an oil (hereinafter, simply referred to as oil) is filled in the gap defined by the shaft 101, the flange 126 and the bearing bore 130a of the sleeve 130.

When injecting the oil into the gap, bubbles are inevitably mixed in the oil. Among such bubbles, description is made as to the bubble that may be present in the gaps 154a and 156a on and under the flange 126. When the sleeve 130 rotates, the oil is subjected to a pressure and a centrifugal force originating from a pumping effect, in the thrust fluid dynamic bearing sections 154 and 156. Though the flange 126 is provided with the thrust dynamic pressure grooves at the upper face and the lower face, normally it is difficult to form the thrust dynamic pressure grooves such that the dynamic pressures on the upper face and the lower face of the flange 126 are accurately balanced in a radial direction. Since an accurate balance of the dynamic pressures is not obtained, the pumping pressures applied to the oil by the thrust fluid dynamic bearing sections 154 and 156 are not balanced either, in a radial direction. Accordingly, the oil pressure in the gap 180a and the oil pressure in the through holes 174 become different, thereby causing the oil to flow from a higher-pressure region toward a lower-pressure region. When the oil flows, for example in a direction indicated by the arrows 190 and 191, the oil circulates through the gap 180a, the gaps 154a and 156a, the through holes 174 and the circulation holes 176. When the oil circulates as above, the bubble in the oil is separated from the oil by a ring-shaped recess 162 provided along an inner circumferential portion of the cap 138, when the oil flows into the through hole 174 from the gap 156a. The separated oil is discharged to ambient air through a gap between a minor diameter portion 101D of the shaft 101 and the cap 138. In this way, the bubbles that have been mixed into the oil at the time of injecting are separated by turns, while circulating the oil utilizing the inevitable unbalance of the dynamic pressures in a radial direction generated by the thrust dynamic pressure grooves, until finally the oil becomes clear of bubble.

In the above-mentioned conventional fluid dynamic bearing unit, the circulation hole 176 of the flange 126 is formed by a perforating process such as drilling. Likewise, the through hole 174 is formed by a machining process to cut away a portion of the surface of the shaft 101, thus to form a flat portion.

When the flange 126 is thicker than approximately 3 mm, it is relatively easy to perform the drilling process to form the circulation hole 176 through the flange 126. However, in the case of a small fluid dynamic bearing unit having a flange of 2 mm or less in thick, an extremely slender drill tip, for example 0.5 mm in diameter, has to be employed, which is too fragile in the drilling tool, therefore, the drilling process becomes difficult. Besides, since the drilling process requires a certain time, it is difficult to reduce the processing time, and it is difficult to reduce the processing cost.

Further, the drilling process produces fine metal powders as a result of cutting a metal material. Removal of the metal powder requires a meticulous cleaning process. However the metal powder may still remain unremoved within the circulation hole in the flange, even after the cleaning process. In the event that the metal powder comes off and intrudes into the narrow gap between the shaft and the sleeve during the operation of the fluid dynamic bearing unit, the rotation is disturbed, and it is not possible to rotate in worst case, thus resulting in a failure of the fluid dynamic bearing unit.

BRIEF SUMMARY OF THE INVENTION

An object of the present invention is to provide a fluid dynamic bearing unit having a flange with an oil circulating hole formed without performing a drilling process, and a method of processing the flange.

A fluid dynamic bearing unit according to the present invention comprises a sleeve including a bearing bore serving as a radial bearing, and a thrust face serving as a thrust bearing, formed around the bearing bore in a larger diameter than the bearing bore, and oriented perpendicular to a central axis of the bearing bore. A shaft is inserted in the bearing bore of the sleeve so as to relatively rotate with respect to the bearing bore. The shaft is provided with at least a flange having a face opposing the thrust face of the sleeve. The flange includes at least two half pieces, at least one of said at least two flange half pieces includes in its surface a path formed in a radial direction and another path connecting the path in the radial direction and to region in the vicinity of an outer circumferential portion of the shaft. Combining the at least two flange half pieces with the radial path disposed therebetween constitutes at least a through hole in a radial direction connecting a region close to an outer circumferential surface of the shaft and a region close to an outer circumferential surface of the flange. At least either of an inner circumferential surface of the bearing bore of the sleeve, or an outer circumferential surface of the shaft is provided with a radial dynamic pressure generating groove. At least either of the face of the flange opposing the thrust face, or the thrust face of the sleeve is provided with a thrust dynamic pressure generating groove. A lubricant is filled in a gap between the shaft and the bearing bore of the sleeve, and between the flange and the thrust face, and an object to be rotated is attached to either the shaft or the sleeve.

According to the present invention, at least either of two flange half pieces is provided with a radially formed groove on the face, and the flange half pieces are mounted on a shaft with the surface with the groove attached to the counterpart, to thereby form a path in a radial direction in the flange. Also, since the respective flange half pieces are provided with another path, which is a groove formed in a vertical direction at an inner circumferential edge thereof, the outer periphery of the shaft and the outer periphery of the flange are connected via the radial path and the other path. The groove on the surface of the flange half piece, which constitutes the radial path within the flange, can be formed by a simple and inexpensive process such as pressing. Therefore, the cost of the flange can be reduced.

According to the present invention, two flange half pieces, respectively provided with a radial groove formed on a surface thereof and a vertical groove formed on an inner circumferential surface of the hole through which the shaft is to be inserted, are mounted on the shaft with the surfaces with the groove adhered to each other. As a result, the flange having a path oriented substantially parallel to the surface of the flange can be formed. Because the groove can be formed through a process that can be performed in a short time without incurring wear of the tool, such as a pressing process, a process cost is inexpensive. Since the pressing process does not produce metal powders or chips unlike drilling to open a hole, such process can eliminate the possibility of a malfunction because of residue of chips in the radial direction through hole of the flange.

BRIEF DESCRIPTION OF DRAWINGS

FIG. 6 is an enlarged fragmentary cross-sectional view showing an operation of the second flange of the fluid dynamic bearing unit according to the first embodiment;

DETAILED DESCRIPTION OF THE INVENTION

Preferred embodiments of the present invention will be described below referring to FIG. 1 through FIG. 13.

First Embodiment

A fluid dynamic bearing unit according to a first embodiment of the present invention will be described referring to FIG. 1 to FIG. 7.

Figure 1:
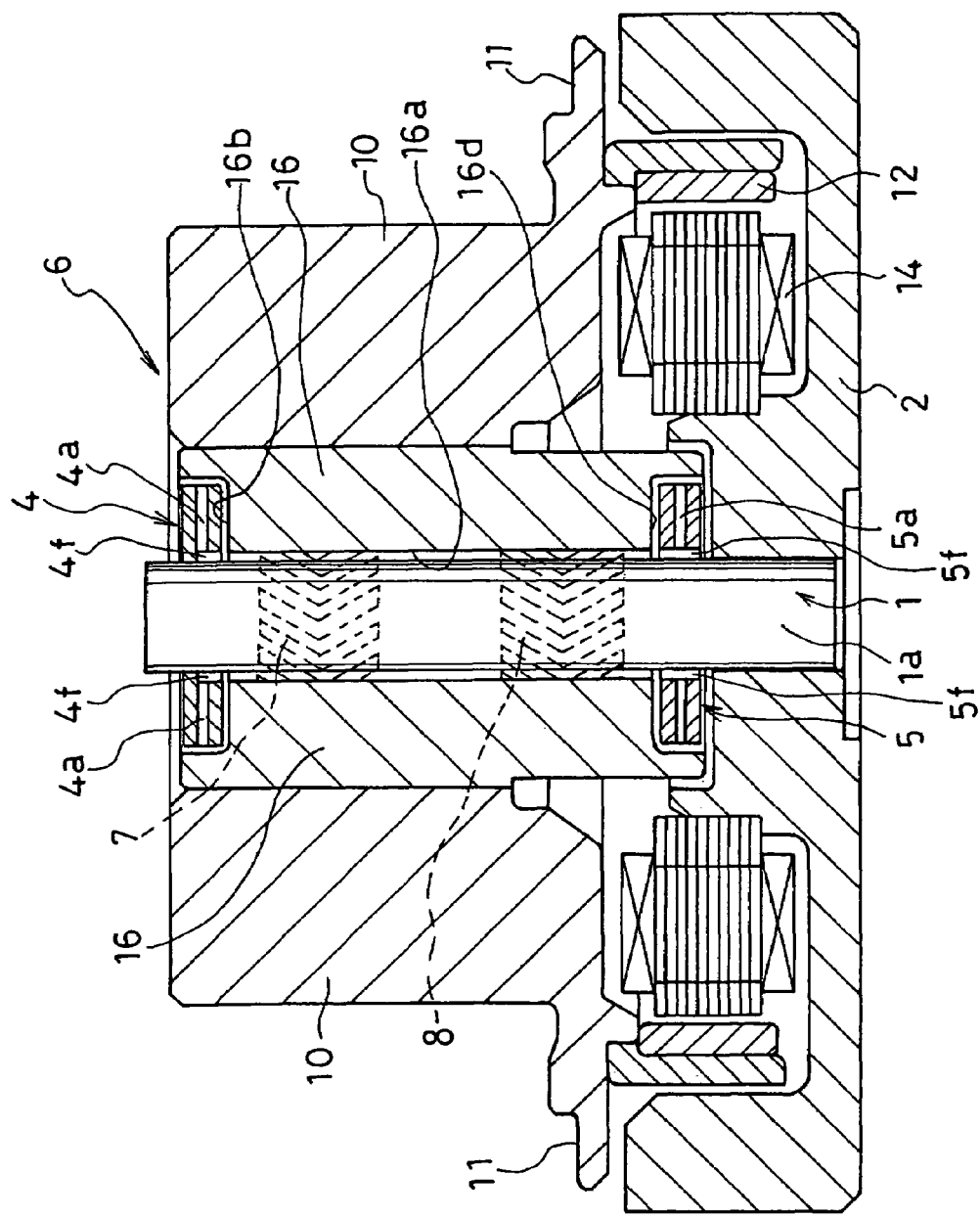
FIG. 1 is a cross-sectional view showing a fluid dynamic bearing unit according to a first embodiment of the present invention.

FIG. 1 is a cross-sectional view showing a fluid dynamic bearing unit according to the first embodiment. In FIG. 1, a column-shaped shaft is fixed to a base plate 2. The shaft 1 is provided with two flanges 4 and 5 attached to an upper portion and a lower portion thereof respectively, according to the orientation of FIG. 1. The shaft 1 is inserted in a bearing bore 16a of a sleeve 16. The sleeve 16 is rotatably placed with a fine gap from the flanges 4 and 5 and the shaft 1. The sleeve 16 is provided with a rotor hub 10 having a rotor magnet 12. To the base plate 2, a motor stator 14 is attached so as to oppose the rotor magnet 12. The rotor hub 10 includes a disk mounting part 11, on which a rotating recording medium such as a magnetic disk (not shown) is attached.

At least either of an outer circumferential surface of the shaft 1, or an inner circumferential surface of the bearing bore 16a, is provided with two sets of herringbone-shaped radial dynamic pressure generating grooves 7 and 8. In FIG. 1, the radial dynamic pressure generating grooves 7 and 8 are provided on an inner circumferential surface of the bearing bore 16a.

Figure 2A:
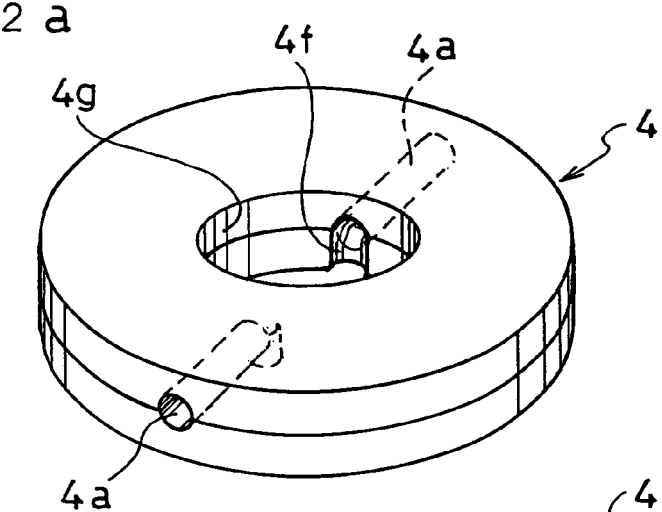
FIG. 2a is a perspective view showing a first flange provided in the fluid dynamic bearing unit according to the first embodiment.
Figure 2B:
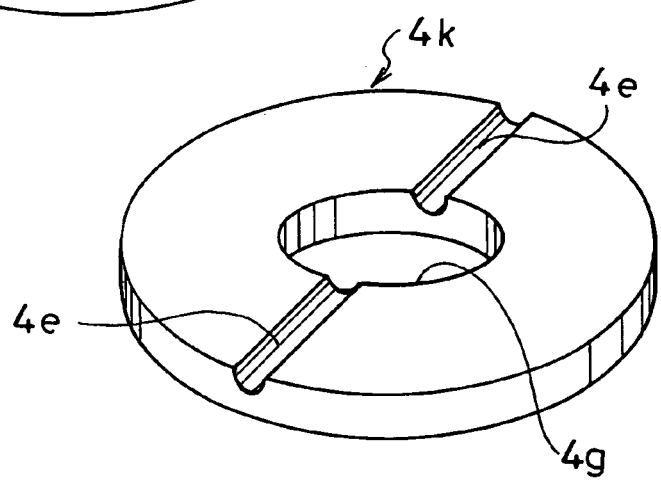
FIG. 2b is a perspective view showing a flange half piece to constitute the first flange.
Figure 2C:
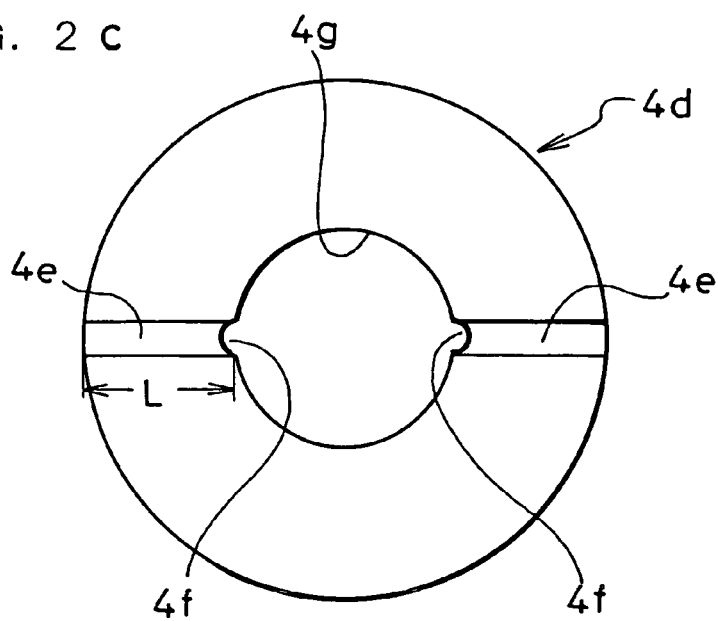
FIG. 2c is a plan view showing the other flange half piece to constitute the first flange.

Referring to FIG. 2, the structure of the flange 4 will be described in details. FIG. 2a is a perspective view of the flange 4. The flange 4 is composed of a flange half piece 4k shown in a perspective view in FIG. 2b and the other flange half piece 4d shown in a plan view in FIG. 2c, combined together. As shown in FIG. 2b, the flange half piece 4k is a disc-shaped component with a hole 4g through which the shaft 1 is to be inserted by press-fitting. On one face of the flange half piece 4k, at least a groove 4e is provided in a radial direction from an outer circumferential edge to the hole 4g. Referring to FIG. 4c, the flange half piece 4d is a disc-shaped component having substantially the same diameter as the flange half piece 4k, with a hole 4g through which the shaft 1 is to be inserted by press-fitting. On a face of the flange half piece 4d, at least a groove 4e is provided in a radial direction. The inner circumferential edge of the groove 4e meets with a vertical groove 4f formed substantially in a vertical direction on an inner circumferential surface of the hole 4g of the flange half piece 4d. The flange half pieces 4d and 4k are combined such that the faces having the groove 4e oppose each other and the groove 4e on the flange half piece 4k and the groove 4e on the flange half piece 4d meet each other. That is how the flange 4 having a hole 4a on an outer circumferential surface, which is communicating with the vertical groove 4f, is obtained as shown in FIG. 2a. Upon press-fitting the shaft 1 with the flange 4, an outer periphery of the flange 4 and a space around a periphery of the shaft 1 under the flange 4 are communicated by the hole 4a and the vertical groove 4f, as shown in FIG. 1.

Figure 4:
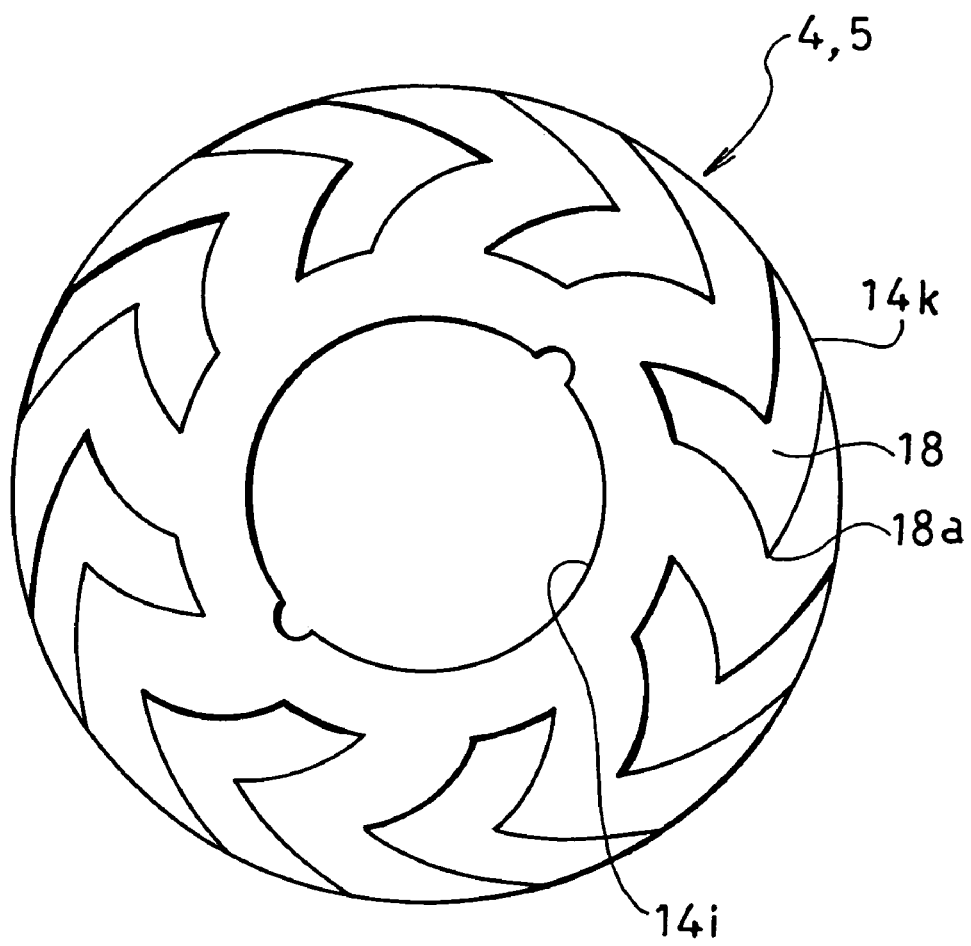
FIG. 4 is a plan view showing a thrust dynamic pressure generating groove formed on the flange according to the embodiments of the present invention.

At least either of a thrust face of a first recess 16b of the sleeve 16, or a face of the flange 4 opposing the recess 16b, is provided with a herringbone-shaped dynamic pressure generating groove 18 shown in FIG. 4 (Though not shown in FIG. 1, the flange 4 has the thrust dynamic pressure generating groove 18).

Figure 3A:
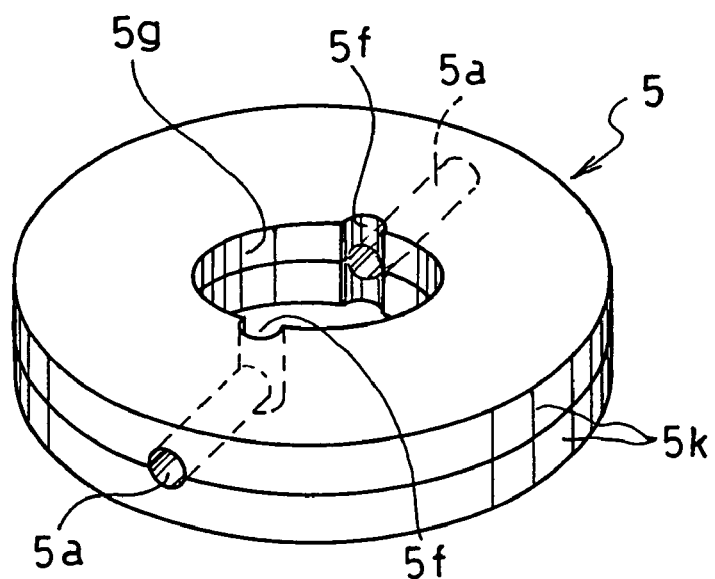
FIG. 3a is a perspective view showing a second flange provided in the fluid dynamic bearing unit according to the first embodiment.
Figure 3B:
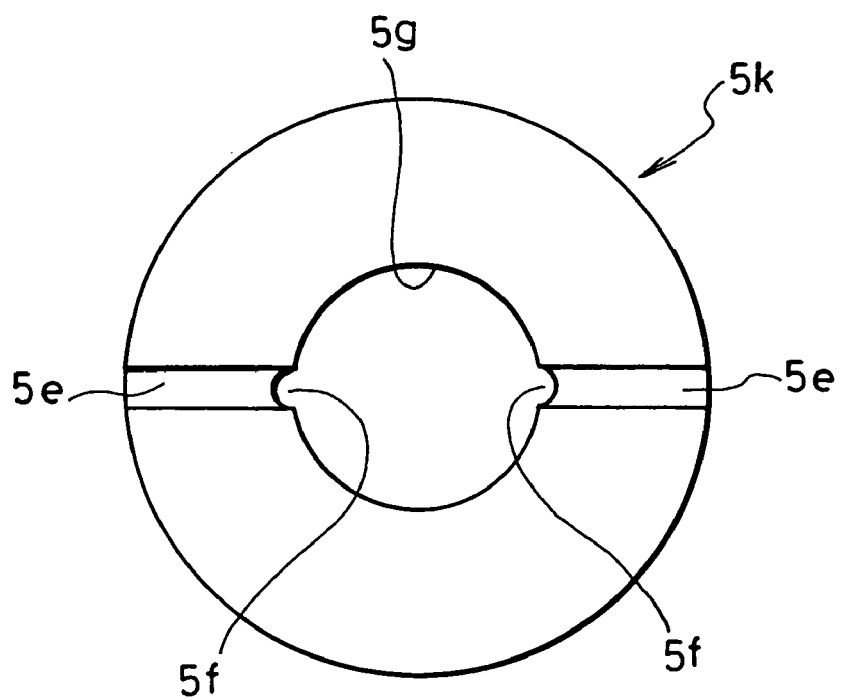
FIG. 3b is a plan view showing a flange half piece to constitute the second flange.

Referring to FIG. 3, the structure of the flange 5 will be described in details. FIG. 3a is a perspective view of the flange 5. FIG. 3b is a plan view of a flange half piece 5k. The flange half piece 5k has a hole 5g at a central position of a disc-shaped component through which the shaft 1 is to be inserted by press-fitting. On a face of the flange half piece 5k, at least a groove 5e is provided in a radial direction. The inner circumferential end of the groove 5e is connected to a vertical groove 5f formed substantially in a vertical direction on an inner circumferential surface of the flange half piece 5k. Upon combining two such flange half pieces 5k such that the faces having the groove 5e oppose each other and the groove 5e on the respective flange half pieces 5k meet each other, the flange 5 as shown in FIG. 3 is obtained. In the flange 5, an outer periphery and an inner periphery thereof are connected via the hole 5a, the hole 5a meets with the vertical groove 5f. Upon press-fitting the shaft 1 into the hole 5g of the flange 5, the structure shown in FIG. 1 is obtained. In the vicinity of the flange 5, an outer periphery of the flange 5 and a space around a periphery of the shaft 1 above and under the flange 5 are communicated via the hole 5a and the vertical groove 5f.

In FIG. 1, at least either of a thrust face of a second recess 16d of the sleeve 16 or an upper face of the flange 5 is provided with a herringbone-shaped dynamic pressure generating groove 18 shown in FIG. 4 (Though not shown in FIG. 1, the flange 5 has the thrust dynamic pressure generating groove 18). It is preferable to form the groove 4e and 5e of the flange 4 and 5 by a pressing process. A pressing time for making the groove 4e and 5e is extremely short (for example 0.2 second). Therefore, the pressing process is excellent in mass production. Besides, since a pressing die has a long service life, a total processing cost becomes significantly low. The thrust dynamic pressure generating groove 18 may be simultaneously formed on the flange half piece, when forming the groove 4e or 5e by pressing.

A lubricant such as an oil (hereinafter, simply referred to as oil) is filled in the first recess 16b including the flange 4, a gap between an outer circumferential surface of the shaft 1 and the bearing bore 16a of the sleeve 16, and the second recess 16d including the flange 5, in the sleeve 16.

An operation of the fluid dynamic bearing unit according to the first embodiment will be described hereafter. When a current is supplied by a power source (not shown) to the motor stator 14, the rotor magnet 12 is subjected to a rotating force, and thereby the rotor hub 6 starts to rotate in a clockwise direction, when the fluid dynamic bearing unit is viewed from above in FIG. 1. Since the sleeve 16 attached to the rotor hub 6 also rotates together, the oil around the radial dynamic pressure generating groove 7 and 8 is subjected to a pumping pressure, which is known in the art, which causes a contactless rotation of the bearing bore 16a of the sleeve 16 with respect to the shaft 1.

Likewise, the thrust dynamic pressure generating groove 18 of the flanges 4 and 5 generates a pumping pressure so as to cause the sleeve 16 to contactlessly rotate with respect to the flanges 4 and 5, as subsequently described in details.

Figure 5:
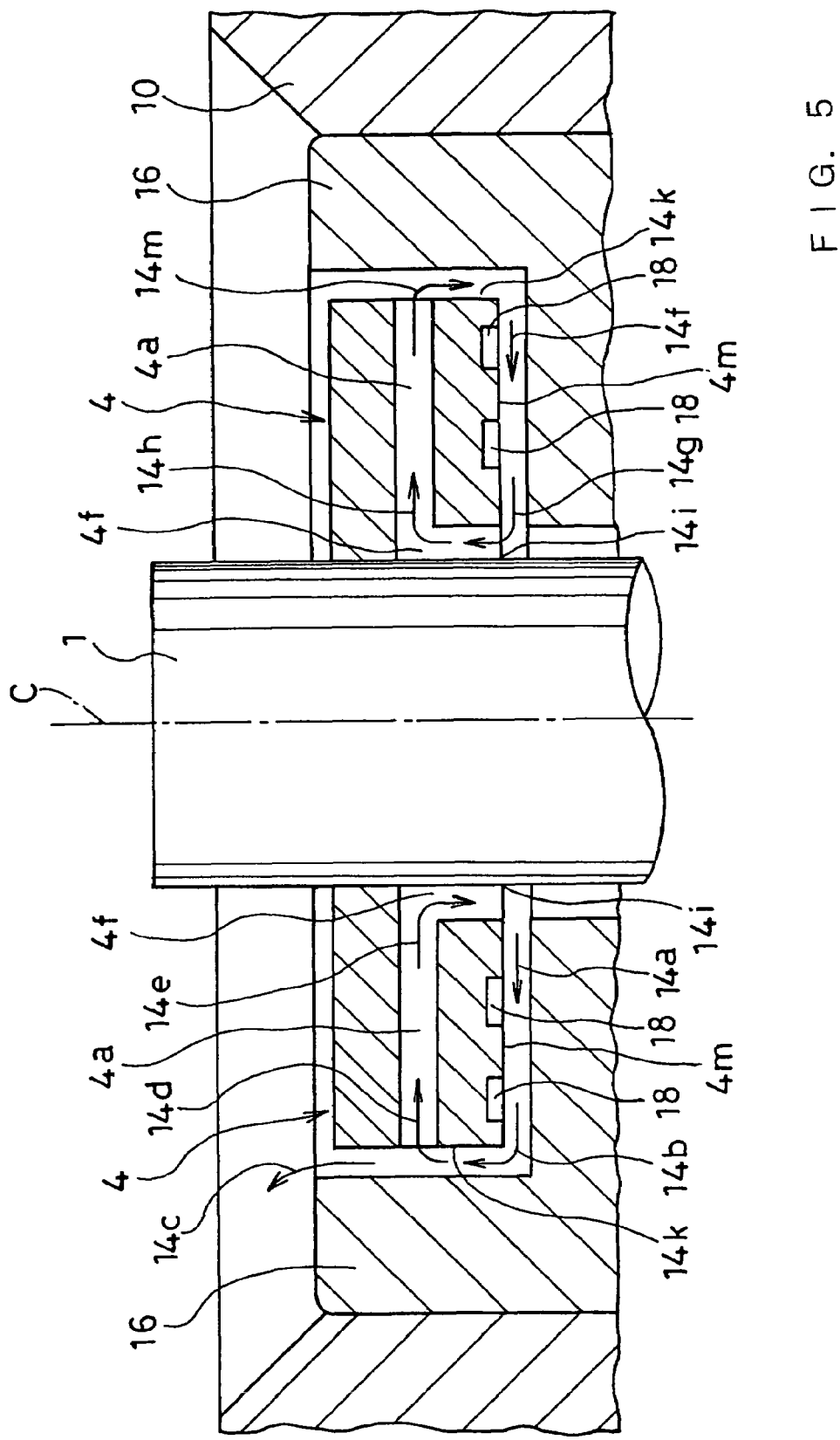
FIG. 5 is an enlarged fragmentary cross-sectional view showing an operation of the first flange of the fluid dynamic bearing unit according to the first embodiment.

FIG. 5 is an enlarged fragmentary cross-sectional view of relevant parts including the flange 4 of FIG. 1. Referring to FIG. 5, when the sleeve 16 is rotating, the oil pressure becomes locally high because of the thrust dynamic pressure generating groove 18 of the flange 4. The oil pressure becomes highest in a region close to a bent portion 18a of the dynamic pressure generating groove 18 of the flange 4 shown in FIG. 4, and becomes gradually lower toward an outer periphery 14k and an inner periphery 14i. In FIG. 5, the oil pressure is lower in the inner periphery 14i and outer periphery 14k, and is highest around a midpoint between the inner periphery 14i and outer periphery 14k.

It is preferable to form the thrust dynamic pressure generating groove 18 so that an oil pressure in the inner periphery 14i and that in the outer periphery 14k become substantially the same. However, practically, the oil pressure in the inner periphery 14i and that in the outer periphery 14k do not become exactly equivalent due to the processing error, etc. of the thrust dynamic pressure generating groove 18, which will hereinafter be defined as "unbalance of oil pressure". When the unbalance of oil pressure is generated, the oil moves from a higher-pressure region to a lower-pressure region. In FIG. 5, the left side portion of the center line C of the flange 4 represents a state where the oil pressure in the outer periphery 14k is lower than in the inner periphery 14i, and hence the oil between the sleeve 16 and the thrust dynamic pressure generating face 4m of the flange 4 moves in a direction indicated by the arrows 14a and 14b. If the hole 4a and the vertical groove 4f were not provided in FIG. 5, the oil would move as shown by the arrow 14c, and a portion of the oil may outwardly overflow through the opening of the fluid dynamic bearing unit.

Once the oil thus overflows, an "oil film breakdown" resultant from lack of the oil may be incurred between the shaft 1 and the bearing bore 16a, between the flange 4 and the recess 16b of the sleeve 16, and between the flange 5 and the recess 16d. The oil film breakdown causes the sleeve 16 to contact the shaft 1 and the flange 4 and 5 during the rotation, which makes the rotation instable and besides causes friction thus significantly reducing the service life of the fluid dynamic bearing unit.

In FIG. 5, the right side portion of the center line C of the flange 4 represents a state where the oil pressure in the outer periphery 14k is higher than in the inner periphery 14i. In this case the oil between the sleeve 16 and the thrust dynamic pressure generating face 4m of the flange 4 moves in a direction indicated by the arrow 14f. If the hole 4a and the vertical groove 4f were not provided, the oil pressure in the inner periphery 14i would become higher, however there is no likelihood that the oil overflows outward.

According to this embodiment, since the flange 4 is provided with the hole 4a and the vertical groove 4f, the oil flowing in the direction of the arrows 14a and 14b in the left side portion of the flange 4 flows through the hole 4a in the direction indicated by the arrow 14d, thus to pass through the vertical groove 4f and return to the region between the sleeve 16 and the thrust dynamic pressure generating face 4m. In other words, the oil circulates through the region between the sleeve 16 and the thrust dynamic pressure generating face 4m, the hole 4a and the vertical groove 4f. Consequently, the oil is prevented from overflowing outward as indicated by the arrow 14c.

Likewise, in the right side portion of the flange 4 in FIG. 5, the oil flows as indicated by the arrows 14f, 14g, 14h and 14m, in other words circulates through the region between the sleeve 16 and the thrust dynamic pressure generating face 4m, the vertical groove 4f and the hole 4a.

FIG. 6 illustrates a flow of the oil in the vicinity of the flange 5. The flange 5 includes a vertical groove 5f in an inner circumferential surface thereof. In FIG. 6, the left side portion of the flange 5 represents a state where the oil pressure in the outer periphery 15k of the flange 5 is higher than in the inner periphery 15i, and hence the oil flows in a direction indicated by the arrows 15a, 15b, 15c and 15d. The oil also flows as indicated by the arrows 15e and 15f. In the right side portion of the flange 5, a state is represented where the oil pressure in the outer periphery 15k of the flange 5 is lower than in the inner periphery 15i, and hence the oil flows in a direction indicated by the arrows 15h, 15s, 15j and 15t. The oil also flows as indicated by the arrows 15m and 15n.

If the flange 5 were not provided with the hole 5a and the vertical groove 5f, a portion of the oil may overflow outward as indicated by the arrow 15p, when the oil pressure in the outer periphery 15k of the flange 5 becomes lower than in the inner periphery 15i, in the right side of the flange 5 in FIG. 6.

According to the first embodiment as mentioned above, the inner periphery 14i and the outer periphery 14k of the flange 4 are communicated via the hole 4a and the vertical groove 4f, and the inner periphery 15i and the outer periphery 15k of the flange 5 are communicated via the hole 5a and the vertical groove 5f. Therefore, even when the thrust dynamic pressure generating groove 18 of the flange 4 and 5 are in unbalance, the oil is prevented from overflowing outside of the fluid dynamic bearing unit, thus realizing a long-term stable operation of the fluid dynamic bearing unit.

In this embodiment, a capacity V of the respective holes 4a and 5a of the flange 4 and 5 is represented by the formula of $V = S \times L \times N$, where S represents the cross-sectional area of the hole 4a or 5a, L the length thereof, and N the number thereof. As a result of various experiments carried out by the present inventors with respect to the fluid dynamic bearing unit of this embodiment, it is preferable that the capacity $V_{4a}$ determined by the cross-sectional area S, the length L and the number N (N=2 in FIG. 2) is equal to or greater than a volume $V_{4g}$ of the oil present in a region between the flange 4 and the sleeve 16, which corresponds to the thrust fluid dynamic bearing section ($V_{4g} \leq V_{4a}$). Likewise, it is preferable that the capacity $V_{5a}$ of the hole 5a is equal to or greater than a volume $V_{5g}$ of the oil present in a region between the flange 5 and the sleeve 16 ($V_{5g} \leq V_{5a}$).

FIGS. 7a to 7e are fragmentary side views of flanges 22 to 26, showing other plural examples of the hole 4a of the flange 4 shown in FIG. 2a, and the hole 5a of the flange 5 shown in FIG. 3a. The flange 22 shown in FIG. 7a has a circular hole 22a. Accordingly, a groove of a semicircular cross-section is respectively formed on flange half pieces 22b and 22c. The flange 23 shown in FIG. 7b has a rhomboidal hole 23a. Accordingly, a groove of a triangular cross-section is respectively formed on flange half pieces 23b and 23c.

Figure 7A:
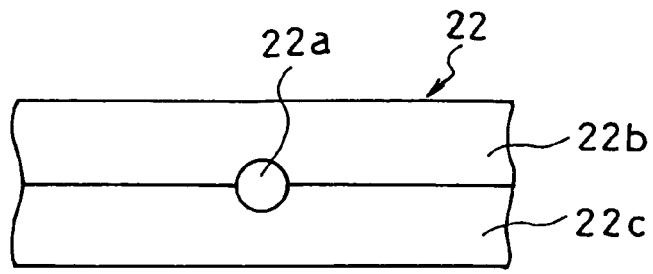
FIGS. 7a to 7e are side views showing the examples of a hole to be provided in the flange of the fluid dynamic bearing unit according to the first embodiment.
Figure 7B:
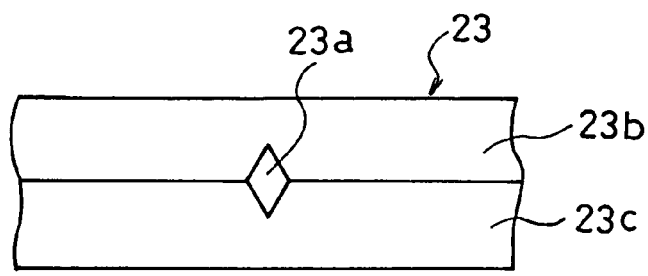
Figure 7C:
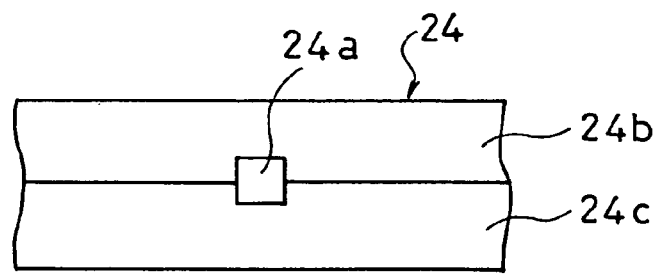

A hole 24a of the flange 24 shown in FIG. 7c has a rectangular cross-section. Accordingly, a groove of a rectangular cross-section is respectively formed on flange half pieces 24b and 24c.

Figure 7D:
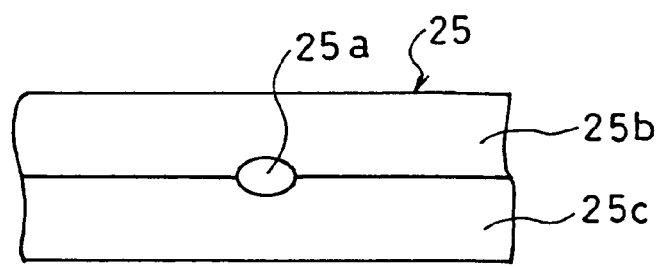

A hole 25a of the flange 25 shown in FIG. 7d has an elliptical cross-section. Accordingly, a groove of an arc-shaped cross-section is respectively formed on flange half pieces 25b and 25c. In the case of the holes 22a to 25a shown in FIGS. 7a to 7d also, it is necessary that the capacity V (=S×L×N) is equal to or greater than the volume of the oil present in the thrust fluid dynamic bearing section.

Figure 7E:
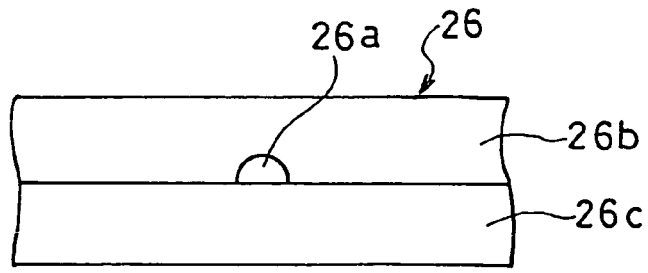

Regarding the holes 22a to 25a shown in FIGS. 7a to 7d, only either of the flange half pieces 26b or 26c (flange half piece 26b in FIG. 7e) may be provided with the groove to form a hole 26a, as shown in FIG. 7e. In this case also, it is appropriate to design the shape of the groove so that the capacity V (=S×L×N) of the hole 26a becomes equal to or greater than the volume V of the oil. Adopting the flange 26 shown in FIG. 7e lowers the processing cost, since only either of the flange half pieces has to be processed to form the groove.

In the fluid dynamic bearing unit shown in FIG. 1, the shaft 1, the flanges 4 and 5 and the sleeve 16 are usually made of a metal. However, a different material such as a ceramic or a resin may also be employed.

In the first embodiment as shown in FIG. 1 and FIG. 4, description is made as to the fluid dynamic bearing unit including a herringbone-shaped radial dynamic pressure generating groove and a herringbone-shaped thrust dynamic pressure generating groove.

A spiral-shaped groove or the like may be employed in the radial and thrust dynamic pressure generating grooves.

Second Embodiment

A fluid dynamic bearing unit according to a second embodiment of the present invention will be described below referring to FIG. 8. In the fluid dynamic bearing unit according to the second embodiment, only the flange is different from that of the first embodiment, and the structure of the remaining portion is the same as the first embodiment shown in FIG. 1.

Figure 8A:
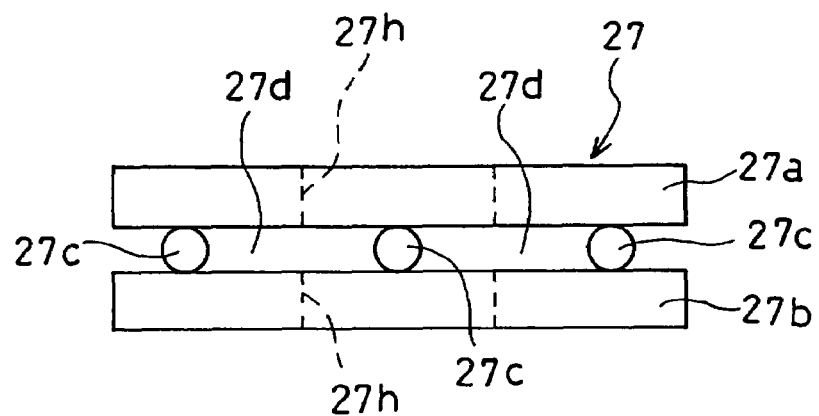
FIG. 8a is a side view showing a structure of a flange employed in the fluid dynamic bearing unit according to a second embodiment of the present invention.

FIG. 8a is a side view of a flange 27 according to this embodiment. The flange 27 is substituted for the flanges 4 and 5 in FIG. 1. In FIG. 8a, a plurality of metal balls 27c to serve as a spacer is placed between flange half pieces 27a and 27b, which are disc-shaped metal plates with a hole 27h through which the shaft 1 (same as the shaft 1 in FIG. 1) is inserted, and adhered to the flange half pieces 27a and 27b by resistance welding or the like. A gap 27d created by the metal balls 27c functions as the hole 4a in FIG. 2 for example. Since the flange 27 according to this embodiment does not require the processing to form a groove on the flange half pieces 27a and 27b, the groove processing cost can be saved.

Figure 8B:
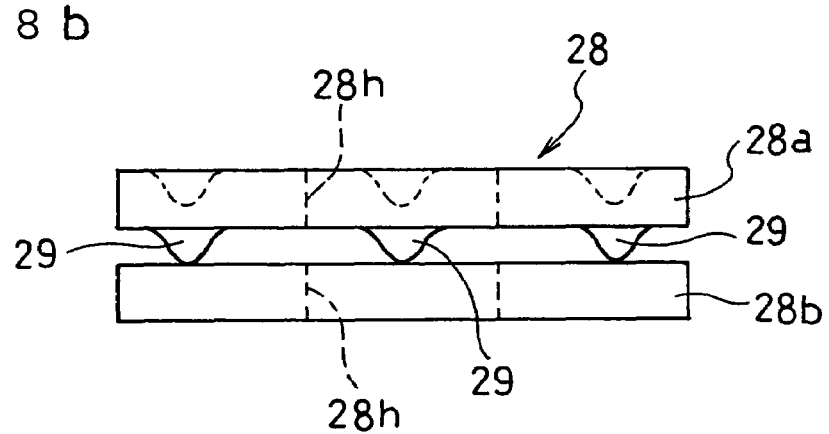
FIG. 8b is a side view showing another structure of the flange according to the second embodiment.

FIG. 8b is a side view of another flange 28 according to this embodiment. In FIG. 8b, flange half pieces 28a and 28b are disc-shaped metal plates with a hole 28h through which the shaft 1 is inserted. The flange half piece 28a is provided with projections 29 formed by pressing. In this case also, the projections 29 of the flange half piece 28a are adhered to the flange half piece 28b by welding or the like, thus to constitute the flange 28. It is to be noted that in FIGS. 7a to 7e and FIGS. 8a and 8b, a vertical groove (for example the vertical groove 4f in FIG. 2) is omitted from illustration.

Third Embodiment

Figure 9A:
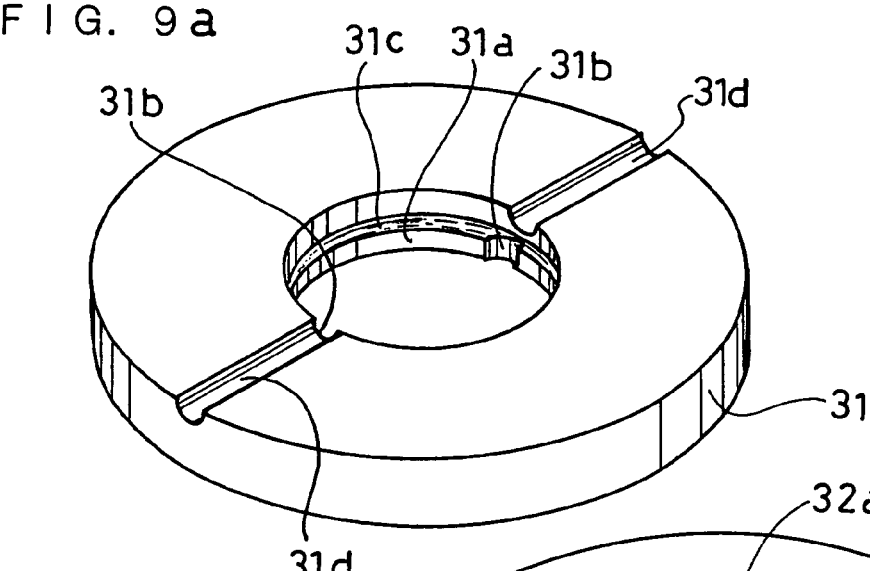
FIG. 9a is a perspective view showing a half piece of a flange employed in the fluid dynamic bearing unit according to a third embodiment of the present invention.
Figure 9B:
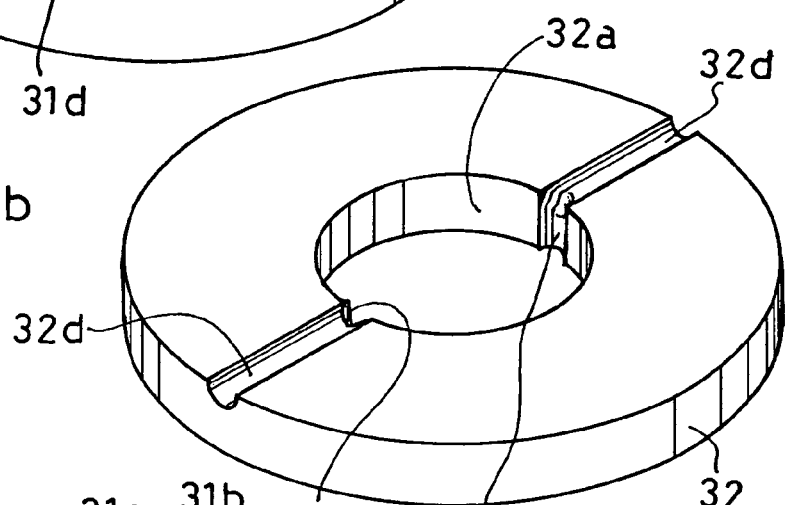
FIG. 9b is a perspective view showing the other flange half piece to constitute the same flange.
Figure 9C:
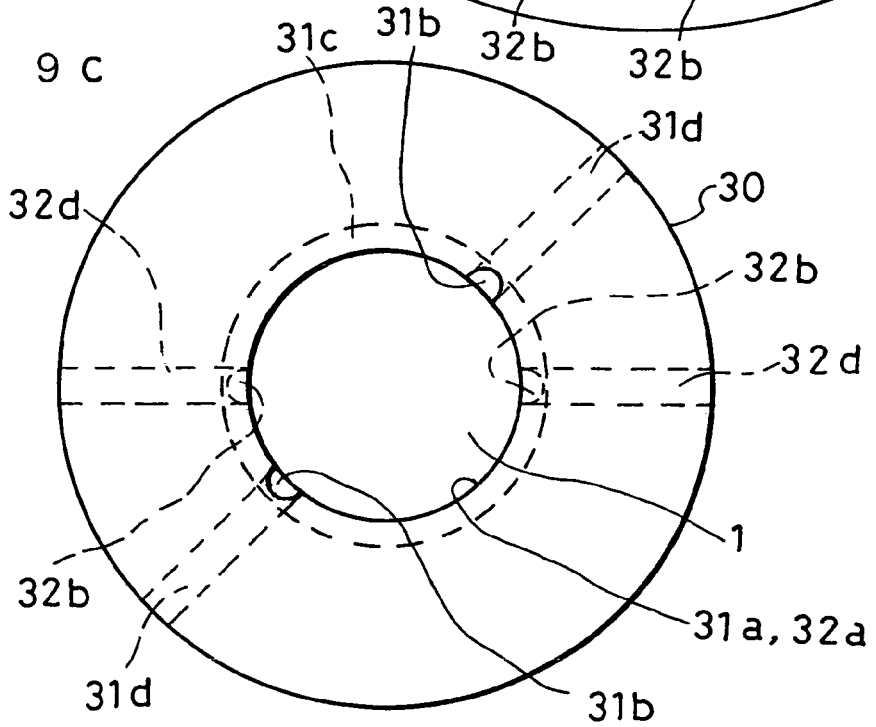
FIG. 9c is a plan view showing the flange constituted of the flange half pieces combined according to the third embodiment.

A fluid dynamic bearing unit according to a third embodiment of the present invention will be described below referring to FIG. 9. In the fluid dynamic bearing unit according to the third embodiment, only the flange is different from that of the first embodiment, and the structure of the remaining portion is the same as the first embodiment shown in FIG. 1. FIG. 9a is a perspective view showing a flange half piece 31 of a flange 30 according to this embodiment shown in FIG. 9c, and FIG. 9b is a perspective view showing the other flange half piece 32. FIG. 9c is a plan view of the flange 30 made by combining the flange half pieces 31 and 32 in this embodiment.

In FIG. 9a, the flange half piece 31 is a disc-shaped plate with a hole 31a formed at a central portion thereof through which the shaft 1 in FIG. 1 is to be inserted. On an inner wall of the hole 31a, at least one vertical groove 31b is provided (for example two vertical groove 31b in FIG. 9a). A circular stepped portion 31c which is concentric with the hole 31a and larger than the hole 31a in diameter is formed on the flange half piece 31. On the surface having the stepped portion 31c of the flange half piece 31, at least one radial groove 31d is formed (for example two grooves in FIG. 9a).

In FIG. 9b, the flange half piece 32 is a disc-shaped plate with a hole 32a through which the shaft 1 in FIG. 1 is to be inserted, formed at a central portion thereof. On an inner wall of the hole 32a, at least one vertical groove 32b is provided. On the either surface of the flange half piece 32, at last one groove 32d is provided in the radial direction (for example two, as FIG.9b). Either the lower face of the flange half piece 31 unseen in FIG. 9a or the lower face of the flange half piece 32 unseen in FIG. 9b is provided with the thrust dynamic pressure generating groove 18 shown in FIG. 4.

Upon combining the flange half pieces 31 and 32 in a manner that the surface having the groove 31d of the flange half piece 31 shown in FIG. 9a contact the surface having the groove 32d of the flange half piece 32 shown in FIG. 9b opposing each other, and the shaft 1 (not shown) is press-fitted, the flange 30 is completed. In the case of the flange 30 according to this embodiment, the groove 31d on the flange piece 31 and the groove 32d on the flange half piece 32 do not have to meet with each other, but may be displaced with each other as shown in FIG. 9c. This is because the grooves 31d and 32d are connected via the stepped portion 31c, even if the grooves 31d and 32d do not oppose with each other as shown in FIG. 9c. Accordingly, when press-fitting the flange half pieces 31 and 32 on to the shaft 1, it is not necessary to adjust the position so as to match the grooves 31d and 32d, which simplifies the manufacturing process. Since the vertical grooves 31b and 32b serve to connect the upper face and the lower face of the flange 30 shown in FIG. 9c, the flange 30 has substantially the same function as the flange 5 shown in FIG. 1. Omitting either of the vertical groove 31b of the flange half piece 31 or the vertical groove 32b of the flange half piece 32 constitutes a flange that has substantially the same function as the flange 4 of FIG. 1.

Figure 10A:
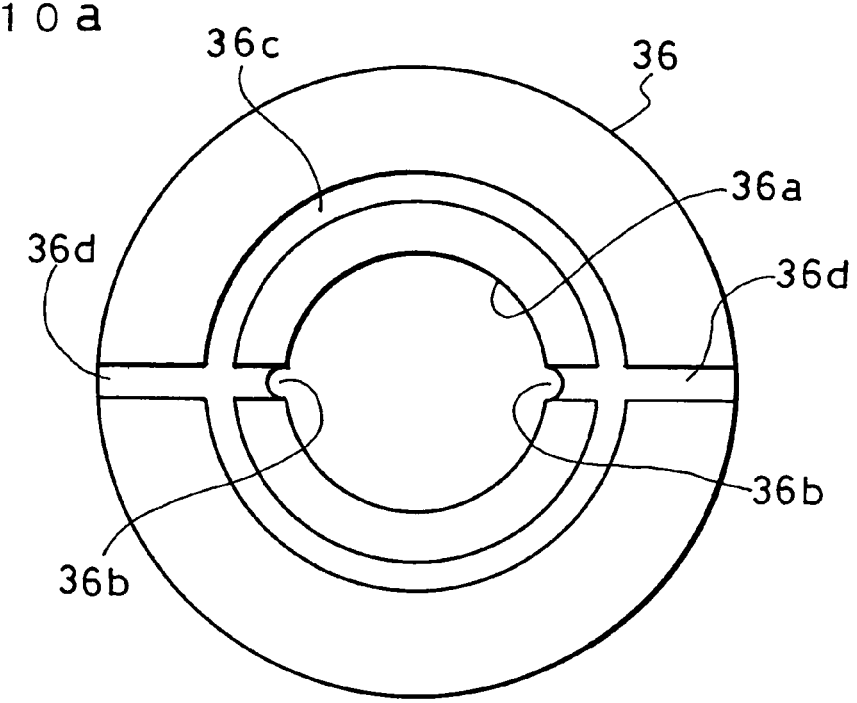
FIG. 10a is a plan view showing a half piece of a flange employed in the fluid dynamic bearing unit according to the third embodiment.

FIG. 10a is a plan view showing a flange half piece 36 of another example of flange 37 employed in the fluid dynamic bearing unit according to the third embodiment. The flange half piece 36 is a disc-shaped plate with a hole 36a formed at a central portion thereof through which the shaft 1 in FIG. 1 is to be inserted. On an inner wall of the hole 36a, at least one vertical groove 31b is formed. On one of the faces of the flange half piece 36, a groove 36d is provided so as to communicate with the vertical groove 36b. The flange half piece 36 is provided with a groove 36c concentrically formed on the same face, and having a larger diameter than the hole 36a. The groove 36c is connected to the groove 36d.

Figure 10B:
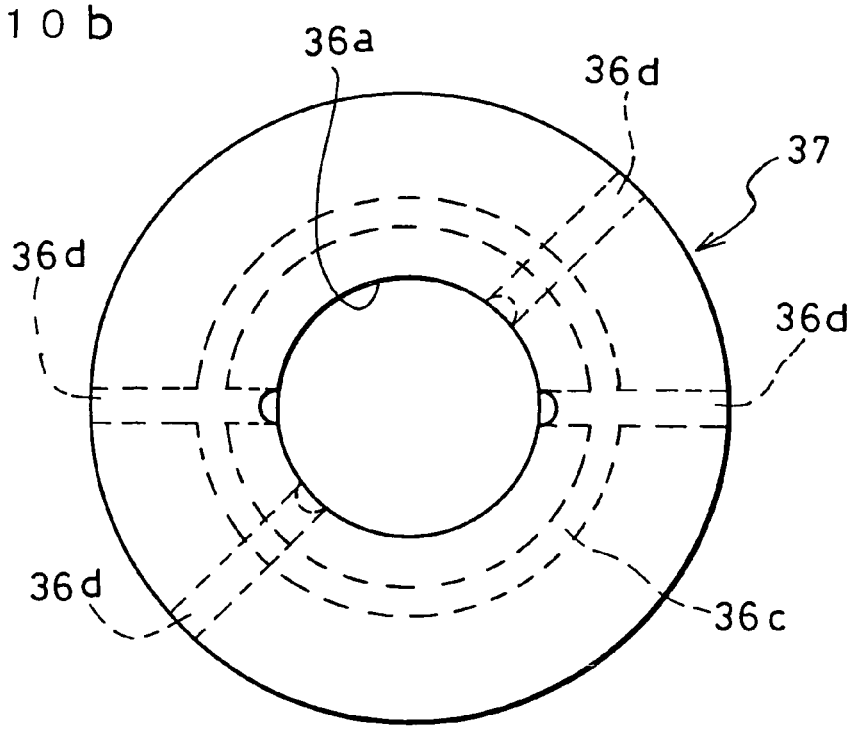
FIG. 10b is a plan view showing the flange constituted of the flange half pieces combined.

Upon press-fitting two flange half pieces 36 mentioned above, with the face having the grooves 36d and 36c placed in contact with each other on to the shaft 1 shown in FIG. 1, the flange 37 shown in a plan view in FIG. 10b is obtained.

In the case of the flange 37 also, it is not necessary to match the respective grooves 36d when attaching the two flange half pieces 36 to the shaft 1. Although the above-mentioned flange 37 is constituted of two of the flange half pieces 36 shown in FIG. 10a, one flange half piece 36 and a disc-shaped component without the grooves 36c and 36d may be combined. In the case of the flange 30 according to the third embodiment also, it is appropriate that the total capacity of the grooves 31d and 32d and the vertical grooves 31b and 32b becomes equal to or greater than the volume of the oil present in the thrust fluid dynamic bearing section.

The stepped portion 31c and the groove 36c in this embodiment can be simultaneously formed during the pressing process to form the respective grooves 31d and 36d in the radial direction, therefore the processing cost does not increase in comparison with the cost for the flange 4 and others.

Fourth Embodiment

Figure 11:
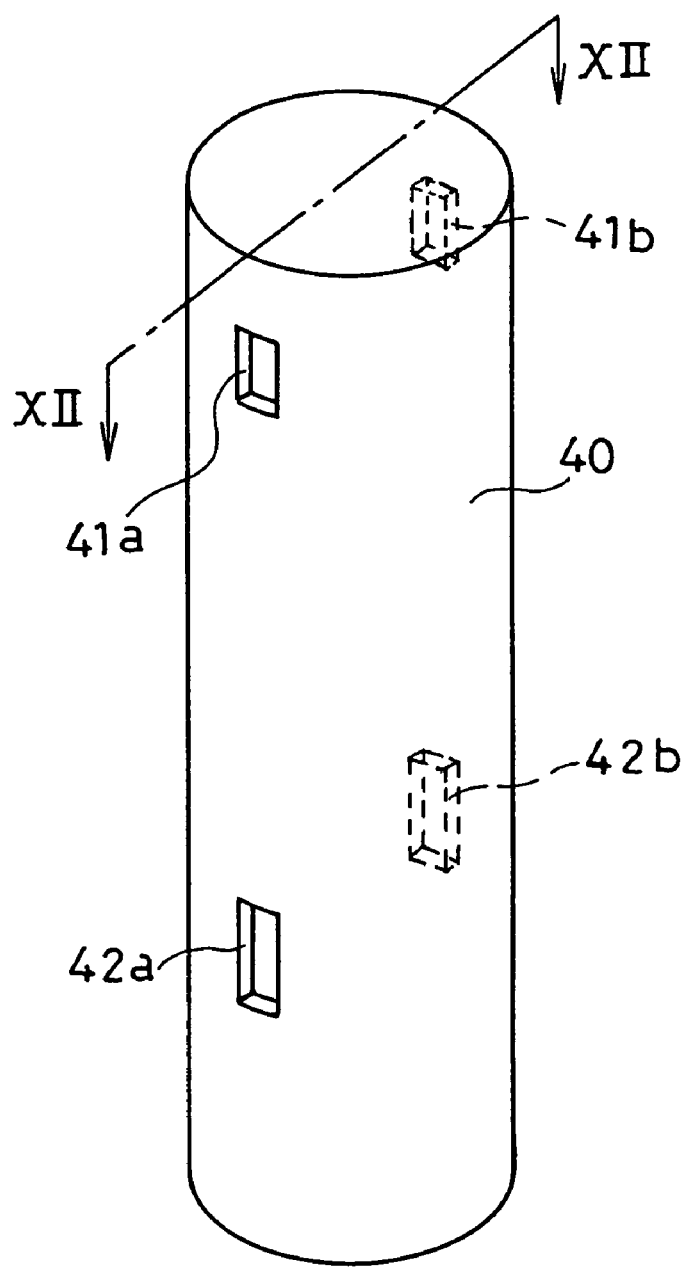
FIG. 11 is a perspective view showing a shaft employed in the fluid dynamic bearing unit according to a fourth embodiment of the present invention.

The shaft provided in the fluid dynamic bearing unit according to a fourth embodiment will be described below referring to FIG. 11 and FIG. 12. In this embodiment, a shaft 40 shown in FIG. 11 is substituted for the shaft 1 of FIG. 1. The shaft 40 is provided with recesses 41a and 42a at an upper and a lower two positions thereof. A recess 41b is provided at the symmetric position of the recess 41a with respect to the central axis of the shaft 40, and the recess 41b is provided at the symmetric position of the recess 42a with respect to the central axis. The recesses 41a, 41b, 42a and 42b can be formed by pressing on a cylindrical bar to be made into the shaft 40.

A flange to be attached to the shaft 40 according to this embodiment is not required to have a vertical groove provided on an inner circumferential surface in the flanges of the foregoing embodiments. The rest of the structure is similar to that of the first embodiment shown in FIG. 1. In comparison with the flange 4 shown in FIG. 2 for example, the vertical groove 4f is not necessary to provide. Also, with respect to the flange 5 shown in FIG. 3, the vertical groove 5f is not necessary to provide.

Figure 12:
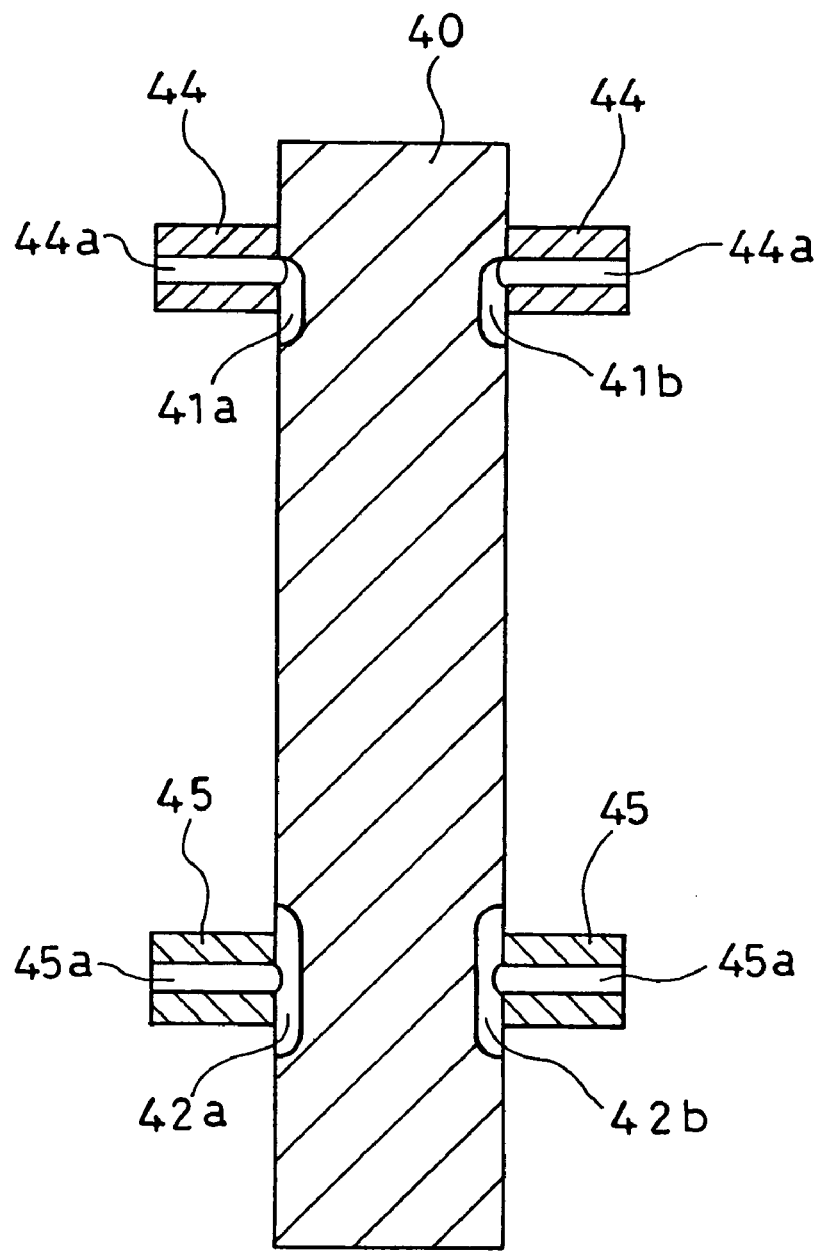
FIG. 12 is a cross-sectional view showing a structure of the shaft and flanges employed in the fluid dynamic bearing unit according to the fourth embodiment.

According to the fluid dynamic bearing unit of this embodiment, flanges 44 and 45 of the same structure as FIG. 2, except for the absence of a vertical groove on an inner circumferential surface, are attached to the shaft 40 at positions corresponding to the recesses 41a, 41b and 42a, 42b, as shown in FIG. 12. As a result, a hole 44a in the flange 44 is communicated with an outer periphery of the shaft 40 via the recesses 41a and 41b of the shaft 40. Likewise, a hole 45a in the flange 45 achieves communication with an outer periphery of the shaft 40 via the recesses 42a and 42b provided thereon.

Fifth Embodiment

Figure 13:
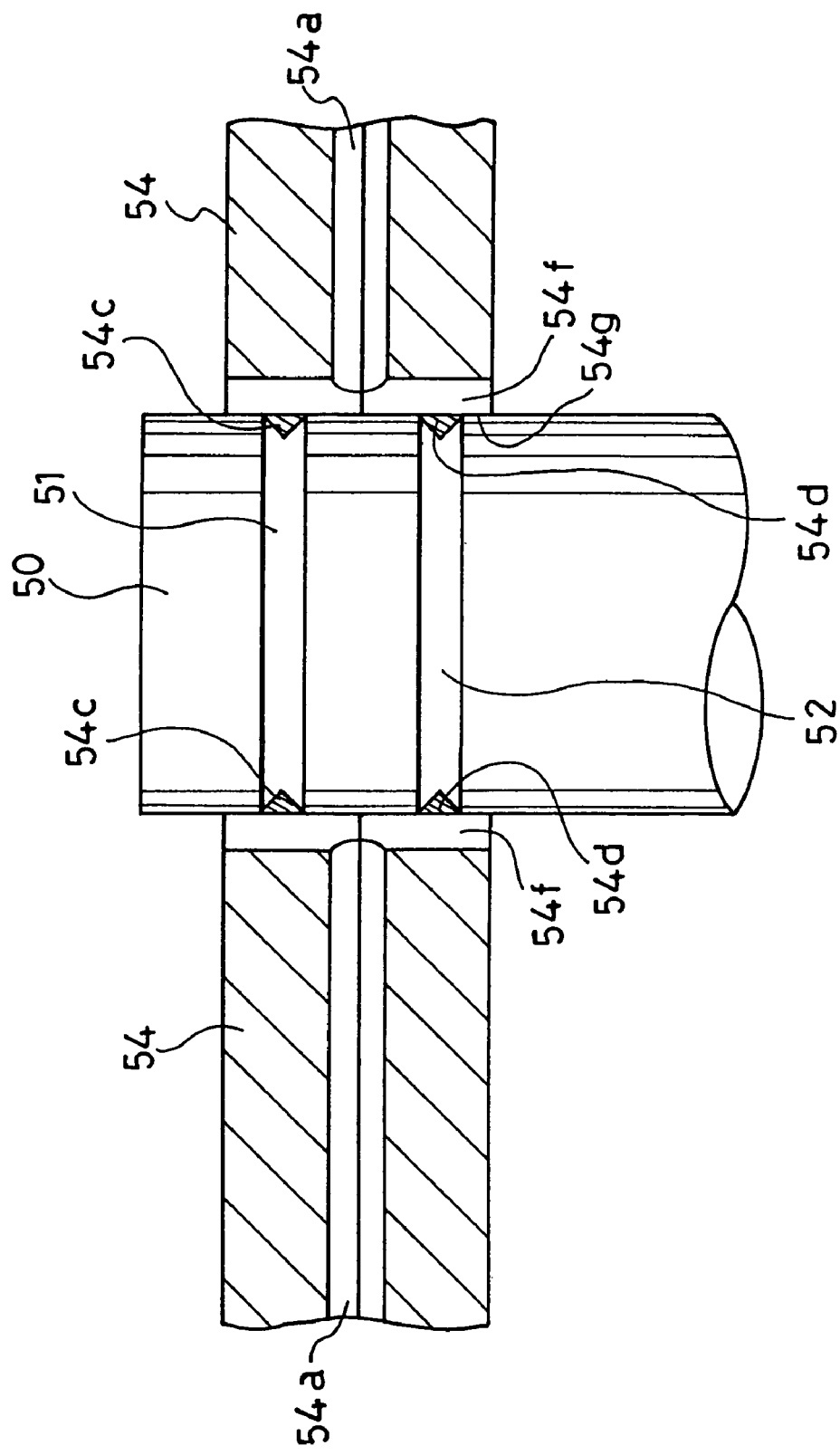
FIG. 13 is an enlarged fragmentary cross-sectional view showing a structure of a shaft and a flange in the fluid dynamic bearing unit according to a fifth embodiment of the present invention.
Figure 14:
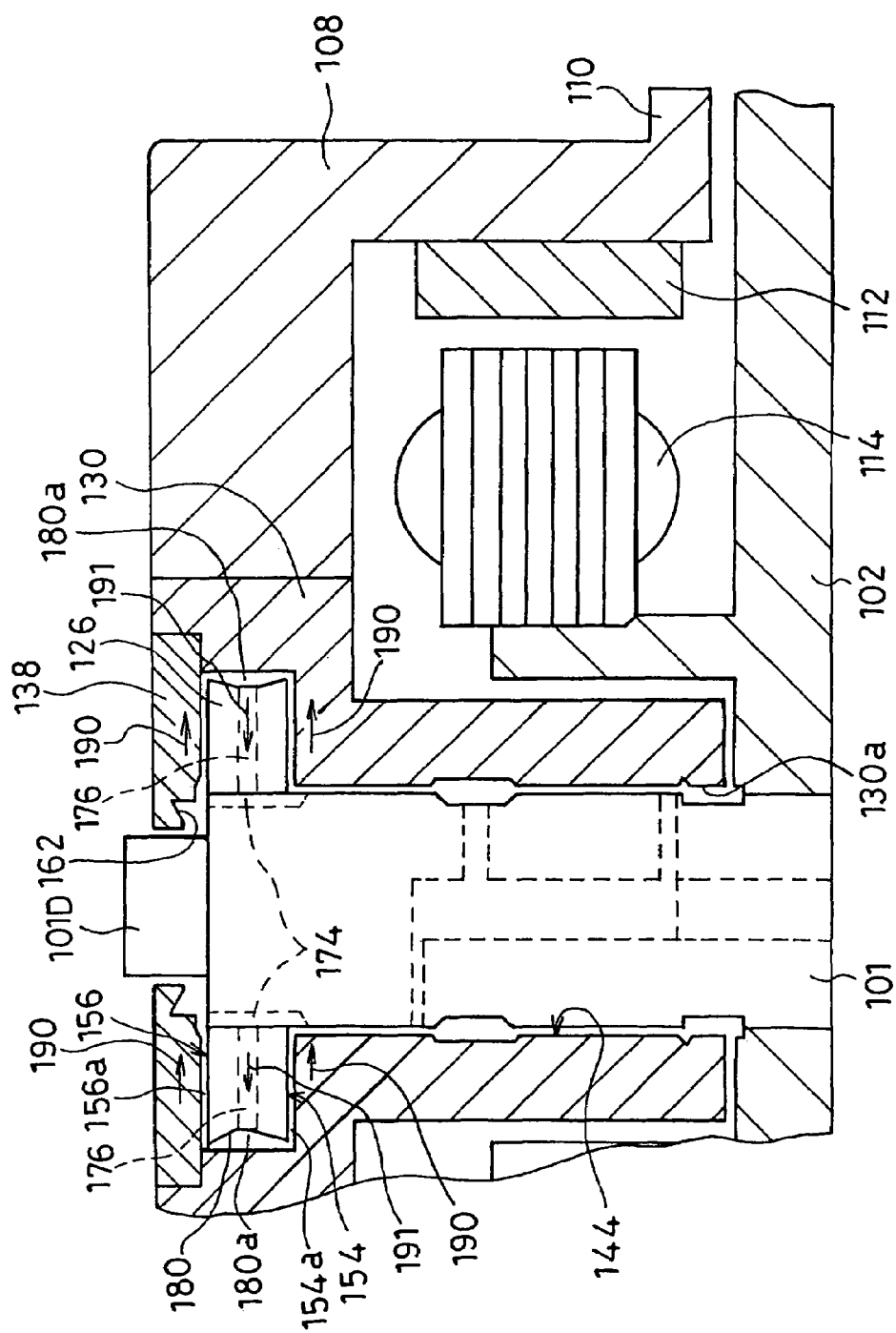
FIG. 14 is the fragmentary cross-sectional view showing the conventional fluid dynamic bearing unit.

The shaft provided in the fluid dynamic bearing unit according to a fifth embodiment will be described below referring to FIG. 13. In this embodiment, a shaft 50 is provided with two grooves 51 and 52 on an outer circumferential surface. Also, a flange 54 is provided with projections 54c and 54d on an inner circumferential surface 54g. The projections 54c and 54d are preferable to be formed along the entire inner circumferential surface 54g, but the projections 54c and 54d may be partially formed. A spacing (pitch) between two grooves 51 and 52 of the shaft 50 and a spacing between the projections 54c and 54d are made equal.

According to this embodiment, the projections 54c and 54d are fitted into the grooves 51 and 52, when the shaft 50 is press-fitted into the flange 54. Therefore, the flange 54 can be accurately positioned. As a processing method of projections 54c and 54d, it is preferable to apply the pressure to a region around the hole 4g of the flange 4 shown in FIG. 2, for example, so that an inner circumferential portion slightly protrudes inward, when forming the groove 4e by pressing.

The invention claimed is:

1. A fluid dynamic bearing unit comprising:
a sleeve including a bearing bore serving as a radial bearing, and a thrust face serving as a thrust bearing, formed around said bearing bore in a larger diameter than said bearing bore, and oriented perpendicular to a central axis of said bearing bore;
a shaft inserted in said bearing bore of said sleeve so as to relatively rotate with respect to said bearing bore; and
at least one flange attached to said shaft and having a face opposing said thrust face of said sleeve, wherein
said flange includes at least two flange half pieces, at least one of said at least two flange half pieces includes in its surface a path formed in a radial direction and another path connecting said path in the radial direction to a region in the vicinity of an outer circumferential portion of said shaft, and at least a through hole formed in a radial direction upon combining said at least two flange half pieces with said radial path disposed therebetween, so as to connect a region in the vicinity of an outer circumferential surface of said shaft and a region in the vicinity of an outer circumferential surface of said flange;
a radial dynamic pressure generating groove is formed on at least either of an inner circumferential surface of said bearing bore of said sleeve or an outer circumferential surface of said shaft; and
a thrust dynamic pressure generating groove is formed on at least either of the face of said flange opposing said thrust face, or said thrust face of said sleeve;
a lubricant is filled in a gap between said shaft and said bearing bore of said sleeve, and between said flange and said thrust face; and
an object to be rotated is attached to either said shaft or said sleeve.

2. The fluid dynamic bearing unit according to claim 1, wherein
said at least two flange half pieces respectively are provided with a hole through which said shaft is inserted, said path includes at least one radial groove, and said another path includes a vertical groove formed on an inner circumferential surface of said hole along an axis of said shaft, so as to communicate with said radial groove; and
said flange is formed by contacting said at least two flange half pieces so that said radial grooves are aligned.

3. The fluid dynamic bearing unit according to claim 2, wherein
said radial groove is provided on both of said two flange half pieces; and said two flange half pieces are attached to said shaft in a manner that said radial grooves oppose each other.

4. The fluid dynamic bearing unit according to claim 2, wherein
said radial groove has a cross-sectional shape selected out of a semicircular shape, a triangular shape, a rectangular shape and an arc shape.

5. The fluid dynamic bearing unit according to claim 2, wherein
at least one of said at least two flange half pieces is provided with a groove formed so as to surround said hole through which said shaft is inserted, with a predetermined interval from said hole.

6. The fluid dynamic bearing unit according to claim 2, wherein
said shaft is provided with a recess formed on an outer circumferential surface thereof at a position where said flange is attached; and
said flange is provided with a projection formed on an inner circumferential surface of said hole, so as to fit into said recess of said shaft when said shaft is inserted into said hole.

7. The fluid dynamic bearing unit according to claim 1, wherein
a gap created by a spacer placed between the opposing faces of said two flange half pieces serves as said through hole in the radial direction of said flange.

8. The fluid dynamic bearing unit according to claim 1, wherein
a gap created by a projection formed at least on either of the opposing faces of said two flange half pieces serves as said through hole in radial direction of said flange.

9. The fluid dynamic bearing unit according to claim 1, wherein
at least ether of said at least two flange half pieces includes a stepped portion formed around said hole through which said shaft is inserted.

10. The fluid dynamic bearing unit according to claim 1, wherein
said shaft is provided with at least one recess having a predetermined length in the axial direction of said shaft on an outer circumferential surface thereof, at a position where said flange is attached.

* * * * *